United States Patent [19]

Budějicky

[11] 3,996,614
[45] Dec. 7, 1976

[54] DEVICE FOR READING A MAGNETIZED RECORD CARRIER

[75] Inventor: Jaromir Budějicky, Rijswijk, Netherlands

[73] Assignee: U.S. Philips Corporation, New York, N.Y.

[22] Filed: May 7, 1975

[21] Appl. No.: 575,182

[30] Foreign Application Priority Data

May 13, 1974  Netherlands .................... 7406380

[52] U.S. Cl. .............................................. 360/45
[51] Int. Cl.² ......................................... G11B 5/09
[58] Field of Search .............................. 360/43, 45

[56] References Cited
UNITED STATES PATENTS

| | | | |
|---|---|---|---|
| 3,711,843 | 1/1973 | Galuagni et al. | 360/45 |
| 3,840,892 | 10/1974 | Hayashi | 360/45 |

Primary Examiner—Vincent P. Canney
Attorney, Agent, or Firm—Frank R. Trifari; Simon L. Cohen

[57] ABSTRACT

The invention relates to a device for reading digital information which is stored as a bivalent state of a moving carrier, for example, the magnetization direction of a tape. Reading causes a differentiating effect. A coil of the read member constitutes, in conjunction with a parallel connected capacitor, a resonant filter having a mediocre Q factor, so that the signal components of comparatively high frequency are slightly amplified. The output of the resonant filter has connected thereto an amplifier. A branch line for comparatively low frequencies with a filter having a drooping amplitude/frequency characteristic is connected to the amplifier. A branch line for comparatively high frequencies in which a filter having a rising amplitude/frequency characteristic is included is also connected to the amplifier. The channels are in phase-opposition with respect to each other, each channel comprising an output amplifier, the outputs of which are interconnected, so that an information signal can be reformed by adding. Detrimental effects due to successive transitions being situated near to each other are thus prevented.

4 Claims, 10 Drawing Figures

DEVICE FOR READING A MAGNETIZED RECORD CARRIER

The invention relates to a device for reading a self-clocking digital information which is stored in the form of a bivalent state of a moving carrier material, the said device comprising a differentiating read member comprising a read winding along which the carrier material can be driven, and furthermore comprising a series arrangement of a resonant circuit and a transmitting device having a drooping amplitude/frequency response curve, an intermediate output and an end output of the series arrangement being connected to inputs of an adding device, having an output on which an information signal is reformed. A device of this kind is known from U.S. Pat. No. 3,441,921 and from the German Patent Specification 1,499,851 which refers to the same priority document and which essentially corresponds thereto. According to one embodiment of the known technique, the output signal of the read member is applied to a discrete differentiating circuit, the output signal thereof being applied to the resonant circuit, the output signal thereof being applied to a phase compensation circuit, and the output signal thereof being applied to a summing output stage as well as to an intermediate amplifier. In conjunction with an integrating circuit and an output amplifier, the intermediate amplifier constitutes a second series connection, the output of which is also connected to an input of the summing output stage. The invention offers a simpler circuit which furthermore offers advantages and which inter alia can be more readily readjusted than the known circuit. To this end, the invention is characterized in that the read winding forms part, together with a capacitor connected parallel thereacross, of said resonant circuit, output leads of the resonant circuit being branched into a first and a second branch line for lower and higher frequencies, respectively, the said first branch line comprising the said transmitting device and the said second branch line comprising a filter device having a rising amplitude/frequency response curve. According to the invention, the read head coil is not followed by an additional differentiating element, but the read head coil directly forms part of the resonant circuit. This is not possible according to the present state of the art, because an additional differentiating circuit is present between the read member and the resonant circuit; this circuit can be dispensed with according to the invention. According to the invention, the resonant circuit has a limited quality factor and the high-frequency part of the signal can be amplified by a few decibels. The low-frequency part of the signal will not be influenced thereby. At the branching point of the leads the signal-to-noise ratio is thus improved, and in a subsequent part of the circuit the amplitude correction may be smaller.

An isolating device is preferably connected between the resonant circuit and the branch lines, with the result that an impedance transformation takes place so as to avoid mutual influencing of the branch lines. The branch lines are thus electrically isolated from the resonant circuit. Because of the impedance transformation, the branch lines do not influence each other and in each branch line an independent correction can be performed on the signal.

The said adding device is preferably formed by interconnected outputs of a first and a second amplifier which are connected in the first and the second branch line, respectively. This offers a very simple solution for the adding device and, moreover, the branch lines do not influence each other on the output side either.

The said first and second branch line preferably introduce a phase difference of 180° with respect to each other. A correct phase relationship is thus created in a simple manner.

The invention will be described in detail hereinafter with reference to some figures.

FIG. 1, consisting of FIGS. A through E, shows a few waveforms as a function of the time.

Figure 1:
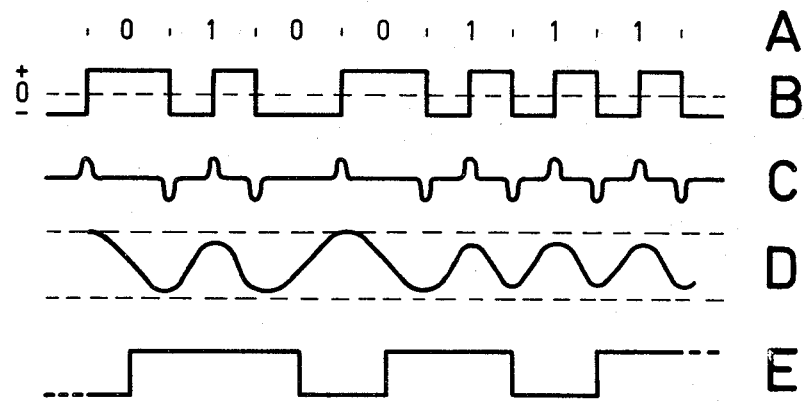

FIG. 1 shows, by way of example, some waveforms as a function of the time; these are shown also in view of known techniques. Line A exhibits binary information elements, each of which occupies a fixed time interval. The limits of the bits cells are denoted by strokes. Line B shows the state corresponding thereto, for example, the magnetization direction in a carrier material. A logic "0" causes a transition at the beginning of the bit cell; a logic "1," moreover, causes a transition in the centre of the bit cell. This concerns a so-termed double-frequency code. The code does not cause signal components having the frequency zero and produces only few components of low frequency, related to a frequency corresponding to the bit cell. The code is self-clocking because at the most one prescribed maximum interval is present between two successive changes in the magnetization direction: there is at least one transition per bit cell.

Line C shows signals supplied by a magnetic read head when the carrier is driven along this head at a uniform speed: each change in the magnetization direction causes a signal pulse of standard size and alternating polarity. This is applicable if the spacing between successive transitions is sufficient, or also if the time intervals between successive transitions passing the read head are so large that the signal pulses do not overlap each other: this is the so-termed recording at low information density.

Line D shows what happens when this code is used when the latter requirement is no longer satisfied. If successive transitions are spaced comparatively far apart (in the case of the information 0—0), the successive pulses overlap only little and the amplitude is comparatively high. If successive transitions are spaced comparatively close together, for example, the central transition of the information 1, successive pulses will substantially overlap. Because successive signal pulses always have the opposite sign, they will then compensate for each other and the amplitude will be comparatively low. This effect is known as "pulse crowding": as the read pulses, caused by the moving carrying material, succeed each other at smaller intervals, they influence each other more, and the output pulses of the read element become increasingly smaller. Furthermore, it may be that a transition is nearer to the next transition on one side than on the other side. The superimposition is not symmetrical in such a case. This causes a shift of the peak of the relevant signal pulse in the direction of the largest interval. The signal pulses are processed in a circuit, and the change in amplitude or location of the pulses can give rise to irrepairable errors in the recovered information, certainly in combination with further disturbances. This is even more applicable if the code is self-clocking, because the clock pulse frequency is generally used for determining the interrogation instants after filtering. Various means are known for reconstructing the original information by correcting the deviations incurred. To this end, use is made of filters which equalize the original relationship between components of different frequency. For this purpose, the total amplitude response must be constant as a function of the frequency, and the phase response must be linear. This is because the latter implies that the entire signal has been uniformly delayed over a fixed period of time.

Line E shows a further code: a logic 0 is represented by a transition in the centre of the bit cell. A logic 1 is represented by a transition at the beginning of the bit cell, unless the immediately preceding information was a logic 0; in the latter case, the transition is omitted. The distance between successive transitions can thus be 1, 1½ or 2 bit cells. This code, "the delay code," is also self-clocking. Many other codes are also known.

Figure 2:
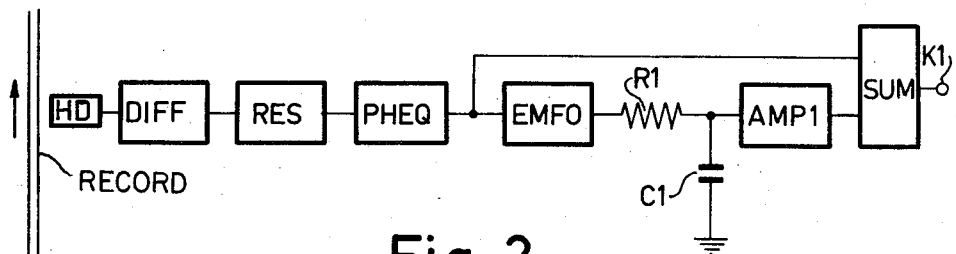
FIG. 2 shows a block diagram of a device according to the present state of the art.

FIG. 2 shows a device for equalizing the frequency response in accordance with U.S. Pat. No. 3,441,921, comprising a carrier layer CARR, a read member HD, a differentior DIFF, a resonant filter RES, a phase compensation circuit PHEQ, two branch lines being connected to the output thereof. The one branch line applies a provisional output signal to the adding device SUM, the other branch line including an emitter-follower EMFO, an integrator with the resistor R1 and the capacitor C1, and an amplifier AMP1. The output thereof is also connected to an input of the adding device SUM. On the output of the adding device SUM a reformed information signal appears on the terminal K1. The integrating action of the latter branch line produces a correction of the low-frequency components. The circuit is constructed as a composition of FIGS. 1 and 4 of the said U.S. Pat. No. 3,441,921 and the German Patent Specification 1,499,851. In the known device the information stored in the moving carrier is differentiated twice (see, for example, the said German Patent Specification 1,499,851, column 5, lines 23, 37, 66). Differentiation is effected the first time in the read member itself. The differentiator circuit behind the head on the one hand provides the necessary amplification of the higher frequencies. On the other hand, the low frequencies are attenuated with respect to the intermediate frequency range. The second effect is undesirable, and should be additionally compensated for at a later stage. Even then a complex phase compensation circuit is required. In the known device the correction on the low-frequency components is performed inter alia by the integrator R1, C1.

Figure 3:
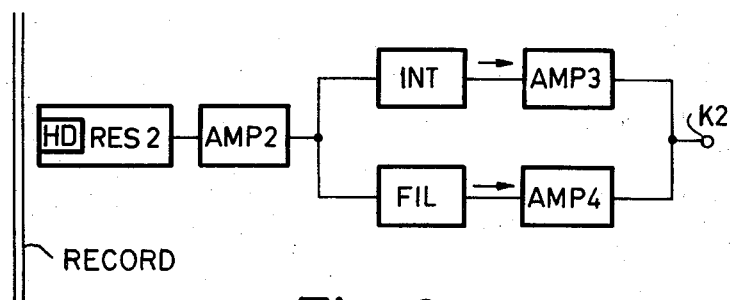
FIG. 3 shows a block diagram of a device according to the invention.

FIG. 3 shows a block diagram of a device according to the invention, comprising a carrier layer CARR, a resonant filter RES2, including a differentiating read member HD, a read amplifier AMP2, a first branch line including an integrator INT and an amplifier AMP3, a second branch line including a filter FIL and an amplifier AMP4, and a common output terminal K2 for the interconnected amplifiers AMP3, 4. The operation will be described with reference to FIG. 4 and further.

According to the invention, differentiation takes place only once; the read member electrically forms part of the resonant filter, and the individual channels alternately correct signal components of higher or lower frequency so as to correct the pulse crowding effect as well as of the effect of the differentiation in the read member HD. Each branch line can thus be readily proportioned. The two branch lines have a common input in this case. The end results can be independently combined by the addition of the two amplifiers.

Figure 4:
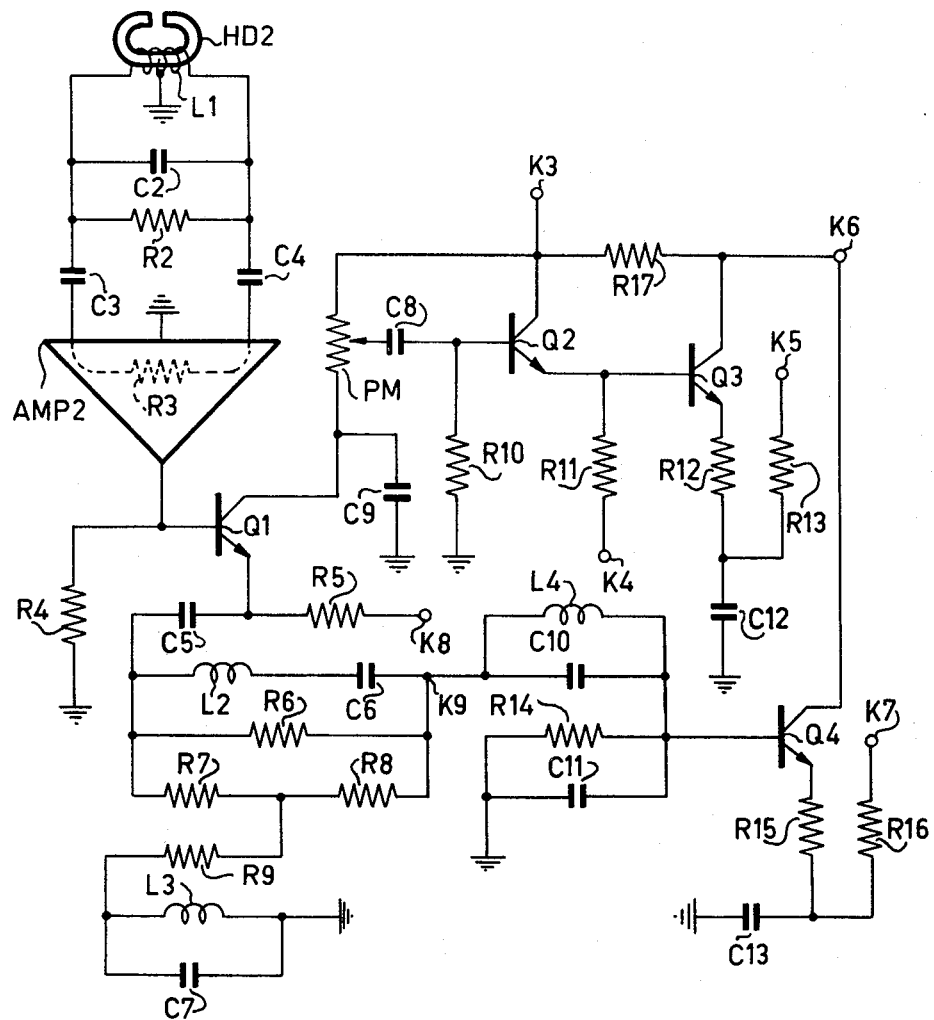
FIG. 4 shows a more detailed diagram of a device according to the invention.

FIG. 4 shows a more detailed diagram of a device according to the invention, comprising a read member HD2, provided with a read coil L1, four transistors QI . . . 4, 12 capacitors C2 . . . 13, three coils L2 . . . 4, 16 resistors R2 . . . 17, one potentiometer PM, one amplifier AMP2, and seven connection terminals K3 . . . 9.

Figure 5:
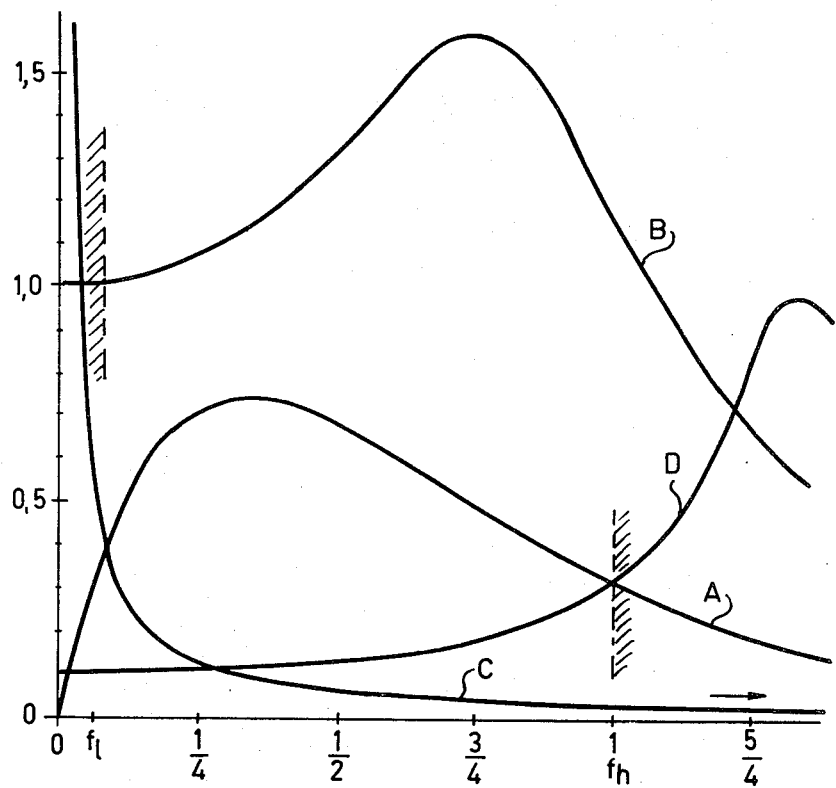
FIG. 5 shows amplitude/frequency curves.

In this diagram, given merely by way of example, the repetition frequency of the information receives is 6.5 megabits/second, coding being effected in accordance with a delay code (FIG. 1, line E). The coil L1 performs a differentiating function in known manner with respect to the magnetic flux in the carrier layer which passes the member HD2 at a uniform speed. The amplitude response of the read member is at first proportional to the frequency of a signal component and the phase shift for all frequencies of +90°. In practice the amplitude response is shaped as shown in FIG. 5, curve A. The frequency is plotted along the horizontal axis as a fraction of a higher limit frequency $f_h$. A lower limit frequency is denoted as $f_1$, which in this case is approximately equal to $f_h$: 16; however, the invention is not restricted thereto. The working range lies between $f_1$ and $f_h$. The said proportionality is applicable only to low frequencies: the amplitude response is maximum for approximately $f_h$:3, and drecreases again for high frequencies because of the pulse crowding effect. A uniform total transfer characteristic is desired in the working range.

The coil L1 has an inductance of, for example, 13$\mu$H. This coil constitutes, in conjunction with parasitic capacitances not shown, a variable capacitor C2 having a value of, for example 60 pF, and a resistor R2 of, for example, 1000 ohms, an underdamped (parallel) resonant circuit having a natural frequency of, for example, 6 MHz and a quality factor of, for example 1.7; see the response curve in FIG. 5 (curve B). Because the quality factor is limited, the circuit is not very sensitive to small variations in the parameters. These variations can occur, for example, when the read element is exchanged. Furthermore, no curve of the said circuit, as appears, for example, from FIG. 6, curve B. For the same gradation of the horizontal axis as in FIG. 5, the phase angle is plotted in degrees along the vertical axis (for curve B always ≤ 0°). As regards the noise introduced at a later stage, the signal-to-noise ratio is then increased by approximately a factor 1½ in the vicinity of the resonant peak. Due to this amplification, the correction factor for the comparatively high frequencies later need be less large. This also has a favourable effect on the signal-to-noise ratio in the output signal.

The output signal of the resonant circuit passes an RC-network including the capacitors C3, 4 which have a value of, for example, 4 nF. The RC-network blocks, for example, signal components having a frequency below 12 KHz. The amplifier AMP2 has an input impedance of, for example, 6 Kohms and a gain factor 200. Centre tappings of the amplifier AMP2 and the coil L1 are connected to earth.

The output of the differential amplifier AMP2 is connected to the base electrode of transistor Q1 which acts as a branching point. To this end, the value of the resistors is, for example: R4 is 20 Kohms; R5 is 1000 ohms. Terminal K8 is connected to a supply voltage of −6 volts. The branch line for low frequencies departs from the collector electrode. The adjustment of potentiometer PM, for example, betweeen 0 and 1000 ohms, determines the transmission ratio between the two branch lines. This ratio is, for example 2:1.

Figure 6:
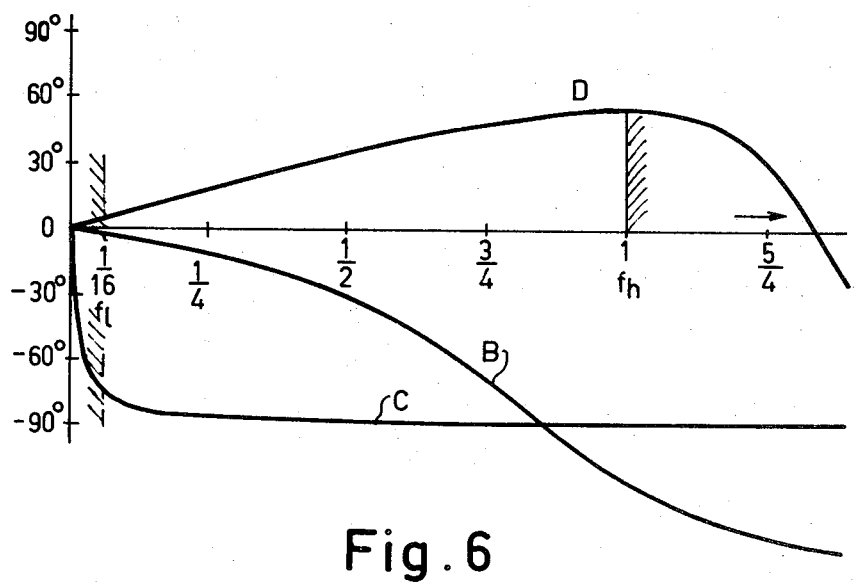
FIG. 6 shows phase/frequency curves.

The branch line for low frequencies includes an RC-network with potentiometer PM and capacitor C8 (having a value of, for example, 3nF), thus resulting in a filter having a drooping amplitude/frequency curve and a characteristic frequency of, for example, 0.4 MHz. The attenuation factor is proportional to the frequency. In this manner the differentiating action of the read member is compensated for regarding the low frequency part of the frequency range used. Above the lower limit frequency $f_1$, a rather uniform phase shift of −90° is present, the said shift decreasing gradually to 0° below $f_1$. The amplitude and phase responses are shown in FIGS. 5 and 6, curve C. Instead of such an integrating circuit, the first branch line can alternatively include a different filtering device having a drooping amplitude/frequency response and an approximately linear phase/frequency response.

Transistor Q2 operates as an emitter-follower. The emitter electrode thereof is connected to the base electrode of the amplifying transistor Q3. The values of the circuit components are for example: R10 is 20 Kohms; R11 is 10 Kohms; R12 is 620 ohms; R13, R17, are 316 ohms; C12 is 1µF. Terminal K3 is connected, for example, to a supply source of +6 volts; the terminals K4, 5 are connected, for example, to a supply source of −6 volts.

The second branch line for comparatively high frequencies departs from the emitter electrode of transistor Q1 which is connected to an input of a known filter of the "bridged-T" type, having a constant input impedance. Such a filter is described, for example, by O. J. Zobel, Bell System Technical Journal, Volume 7, July 1928, p. 438–534. This filter has a rising amplitude/frequency response curve, with the result that notably the amplitude of components having frequencies just below the upperlimit frequency $f_h$ is increased. An advantageous choice of the response curves is given in the FIGS. 5, 6, curve D. The amplitude/frequency response curves are not always shown at the same scale. The values of the elements of the filter are, for example, as follows: C5 is 0.1µF; L2 is 23.3µH; C6 is 15 pF; R6 is 6800 ohms; R7, 8 are 316 ohms; R9 is 16.6 ohms; L3 is 1.5µH; C7 is 230 pF. The maximum of the amplitude/frequency response curve lies, for example, at approximately 4/3 times the highest frequency $f_h$. This choice is dependent of various factors and should be optimized in accordance with the quality factor of the resonant circuit used and the linear information density on the carrier layer. Such a choice on the one hand leads to a correct amplitude response. Furthermore, a major part of the curvature of the phase/frequency response of the circuit of the read member is compensated for. Instead of the said filter, use can alternatively be made of an other filter, for example, an RC network having a suitable time constant. In the case of a straight phase/frequency response, the entire signal is shifted over a fixed period of time as if it were.

The output of the said filter (terminal K9) is connected to a noise filter which blocks undesired signal components of frequencies exceeding approximately 8.5 MHz. The values of the components thereof are, for example: L4 is 4.1 nH; C10 is 81 pF; C11 is 45 pF. In the branch line for comparatively low frequencies, such a noise filter can be dispensed with because the integrating function of this branch line already adequately attenuates high-frequency components.

The output of the noise filter is connected to the base electrode of transistor Q4 which acts as a signal amplifier. Terminal K17 is connected to a supply source of, for example, −6 volts; the variable resistors have, for example, the following values: R14, 16 are 316 ohms; R15 is 680 ohms. Transistors Q3, 4 have a common collector resistor, so that the resultant currents are added. The overall response can be varied by changing the various gain factors. The channels are in phase-opposition with respect to each other, because of the action of transistor Q1, so as to achieve a monotonous overall phase response.

Figure 7:
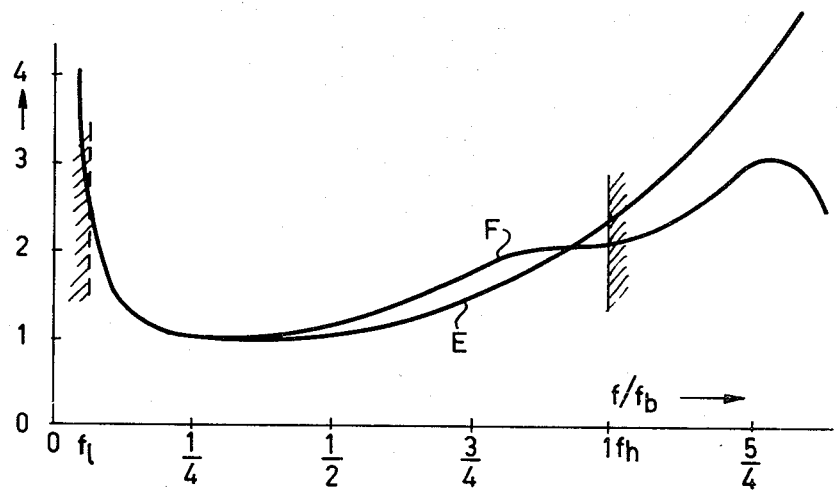
FIG. 7 shows further amplitude/frequency curves.
Figure 8:
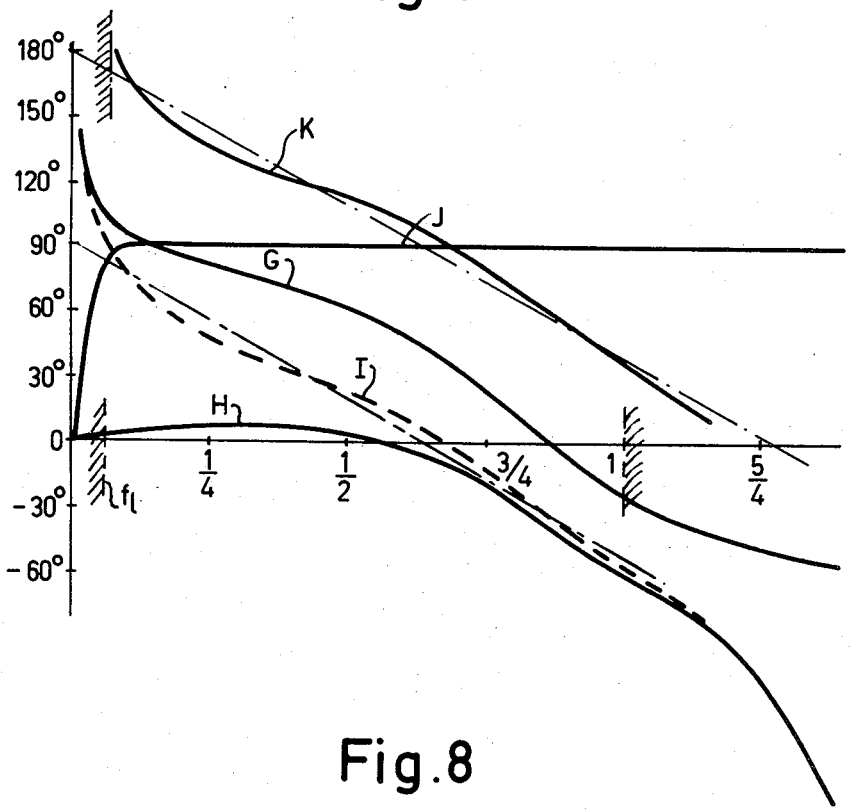
FIG. 8 shows further phase/frequency curves.

FIGS. 7, 8 shows the response curves of the individual channels and of the overall circuit. Curve G shows the phase response of the branch line for low frequencies between the coil L1 and the terminal K6. Curve H shows the phase response of the branch line for high frequencies, again between the coil L1 and the terminal K6. Curve I shows the overall phase response for the entire circuit. In this example the gain factor in the branch line for lower frequencies is 6 $d_B$ higher than in the other branch line. The deviation from a straight line (stroke-dot line) through the point +90° at the frequency zero is at the most a few degrees in the working range.

Curve J of FIG. 8 corresponds to FIG. 6, curve C, and shows the phase shift caused by the differentiating action of the reading process (with opposite sign). Combination of curves I and J results in curve K as the end result for the entire device, which is again approximated by a straight stroke-dot line. At the frequency zero, the phase shift is +180° (inversion) and furthermore proportional to the frequency. This means a shift of all components over a constant period of time. Curve F in FIG. 7 shows the amplitude response of the entire circuit behind the read member HD2, and E shows the desired curve (this curve is, therefore, the inverse of FIG. 5, curve A). Again the deviations in the working range are smaller than approximately 10 percent. All in all, it appears that by means of simple means a uniform amplitude response and a linear phase response are achieved. On the output K6, finally, a processor can be connected in which the coded information is recovered. Such devices are known per se.

The upper and lower limit frequencies are chosen in view of the frequency spectrum of the coding used. When use is made of a delay code, having a bit frequency $f_b$, $f_h$ is chosen to be approximately equal to $f_b$, whilst the lower limit frequency is approximately $f_b/50$. Furthermore, it is generally attempted to keep the capacitance of the read circuit low. In that case a high value can be chosen for the inductance of the read member, thus resulting in a high read voltage.

What is claimed is:

1. A device for reading a self-clocking digital information which is stored as a bivalent state of a moving carrier material, the information being formed by frequencies which are situated in a predetermined frequency range, the said device comprising a differentiating read member provided with a read winding along which the carrier material can be driven, and furthermore comprising an adding device, a series connection of a resonant circuit and a transmitting device having a drooping amplitude/frequency response curve, an intermediate output and a final output of the series connection being connected to inputs of said adding device, an information signal being reformed on an output thereof, output leads of the resonant circuit being branched into a first and a second branch line for lower and higher frequencies, respectively, means for introducing a mutual phase difference of 180° in the said branch lines at the branching point, the said first branch line including the said transmitting device so that within the said working range a substantially constant phase difference is introduced, a filtering device having a rising amplitude/frequency response curve and a phase characteristic which varies substantially in proportion to the frequency being included in said second branch.

2. A device as claimed in claim 1, wherein the read winding forms part of the said resonant circuit, in conjunction with a capacitor which is connected parallel thereacross.

3. A device as claimed in claim 1, wherein between the resonant circuit and the branch lines an isolating device is connected, so that an impedance transformation takes place in order to avoid mutual influencing of the branch lines.

4. A device as claimed in claim 1, wherein the said adding device is formed by the interconnected outputs of a first and a second amplifier which are connected in the first and the second branch line, respectively.

* * * * *